United States Patent
Tarokh et al.

(10) Patent No.: US 9,544,789 B2
(45) Date of Patent: Jan. 10, 2017

(54) SYSTEM AND METHOD FOR CHANNEL ESTIMATION IN A WIRELESS COMMUNICATIONS SYSTEM

(71) Applicant: Huawei Technologies Co., Ltd., Shenzhen OT (CN)

(72) Inventors: Vahid Tarokh, Cambridge, MA (US); Peiying Zhu, Kanata (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 14/104,908

(22) Filed: Dec. 12, 2013

(65) Prior Publication Data

US 2014/0162627 A1    Jun. 12, 2014

Related U.S. Application Data

(60) Provisional application No. 61/736,370, filed on Dec. 12, 2012.

(51) Int. Cl.
| | |
|---|---|
| H04W 72/00 | (2009.01) |
| H04W 24/08 | (2009.01) |
| H04L 25/02 | (2006.01) |

(52) U.S. Cl.
CPC .............. *H04W 24/08* (2013.01); *H04L 25/02* (2013.01); *H04L 25/0204* (2013.01); *H04L 25/0228* (2013.01)

(58) Field of Classification Search
None
See application file for complete search history.

(56) References Cited

U.S. PATENT DOCUMENTS

| | | |
|---|---|---|
| 2004/0127223 A1 | 7/2004 | Li et al. |
| 2008/0008113 A1 | 1/2008 | Cho et al. |
| 2009/0028112 A1 | 1/2009 | Attar et al. |
| 2010/0075689 A1 | 3/2010 | Uemura et al. |
| 2012/0207043 A1 | 8/2012 | Geirhofer et al. |
| 2012/0275322 A1* | 11/2012 | Ji .................... H04L 1/0027 370/252 |

FOREIGN PATENT DOCUMENTS

| | | |
|---|---|---|
| WO | 2011105726 A2 | 9/2011 |
| WO | 2012061030 A1 | 5/2012 |

OTHER PUBLICATIONS

International Search Report and Written Opinion of Patent Cooperation Treaty (PCT), International Application No. PCT/US2012/074795, Applicant: Huawei Technologies Co., Ltd., date of mailing Augst 15, 2014, 8 pages.

* cited by examiner

*Primary Examiner* — Suhail Khan
(74) *Attorney, Agent, or Firm* — Slater Matsil, LLP

(57) ABSTRACT

A method for estimating communications channels includes determining, by a first device, channel significance information from a transmitting device, the channel significance information including information about communications channels carrying signals that are potentially significant interferers to the first device operating within range of the transmitting device, and estimating, by the first device, channel parameters of the communications channels identified as potentially significant interferers in accordance with the channel significance information. The method also includes transmitting, by the first device, the estimated channel parameters to one of the transmitting device and a controlling device.

35 Claims, 12 Drawing Sheets

SYSTEM AND METHOD FOR CHANNEL ESTIMATION IN A WIRELESS COMMUNICATIONS SYSTEM

This application claims the benefit of U.S. Provisional Application No. 61/736,370, filed on Dec. 12, 2012, entitled "System and Method for Channel Estimation in a Wireless System," which application is hereby incorporated herein by reference.

TECHNICAL FIELD

The present disclosure relates generally to digital communications, and more particularly to a system and method for channel estimation in a wireless communications system.

BACKGROUND

There is a desire to implement multi-cell/sector cooperation (e.g., coordinated multipoint (CoMP)) to provide additional capacity and additional coverage in wireless systems. CoMP, as well as other techniques, is expected to significantly increase available bandwidth in fourth generation (4G) and beyond communications systems. However, CoMP and the other techniques require knowledge of communications channels between transmitter(s) and receiver(s).

Generally, pilot sequences or simply pilots are signals transmitted by a transmission point (TP), such as an enhanced NodeB (eNB), also commonly referred to as a NodeB, base station, communications controller, controller, a cell, a remote radio head (RRH), and the like, to help a receiver, such as a user equipment (UE), also commonly referred to as mobile stations, mobiles, subscribers, terminals, users, and the like, estimate a communications channel between the eNB and the UE. Typically, pilots should be short since communications overhead increases rapidly with pilot length.

SUMMARY OF THE DISCLOSURE

Example embodiments of the present disclosure which provide a system and method for channel estimation in a wireless communications system.

In accordance with an example embodiment of the present disclosure, a method for estimating communications channels is provided. The method includes determining, by a first device, channel significance information including information about communications channels carrying signals that are potentially significant interferers to the first device operating within range of a transmitting device, estimating, by the first device, channel parameters of the communications channels identified as potentially significant interferers in accordance with the channel significance information, and transmitting, by the first device, the estimated channel parameters to one of the transmitting device and a controlling device.

In accordance with another example embodiment of the present disclosure, a method for operating a transmitting device is provided. The method includes generating, by the transmitting device, channel significance information in accordance with interference measurements, the channel significance information including information about communications channels carrying signals that are potentially significant interferers to a user equipment (UE) in a coverage area of the transmitting device, and transmitting, by the transmitting device, the channel significance information to the UE.

In accordance with an example embodiment of the present disclosure, a user equipment (UE) is provided. The UE includes a processor, and a transmitter operatively coupled to the processor. The processor determines channel significance information including information about communications channels carrying signals that are potentially significant interferers to UEs operating with a coverage area of a transmitting device, and estimates channel parameters of the communications channels identified as potentially significant interferers in accordance with the channel significance information. The transmitter transmits the estimated channel parameters to the transmitting device.

In accordance with an example embodiment of the present disclosure, a method for estimating communications channels is provided. The method includes determining, by a communications controller, channel significance information including information about communications channels carrying signals transmitted by user equipments operating in a communications system that are potentially significant interferers to communications controllers of the communications system, estimating, by the communications controller, channel parameters of the communications channels identified as potentially significant interferers in accordance with the channel significance information, and transmitting, by the communications controller, the estimated channel parameters to a subset of the user equipments.

One advantage of an embodiment is that information about communications channels that are potentially significant interferers to a UE is used in the estimation of channel parameters for the communications channels to help simplify the channel parameter estimation process.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to channel estimation in a wireless communications system. For example, a UE determines channel significance information including information about communications channels carrying signals that are potentially significant interferers to UEs operating within a coverage area of a transmitting device, estimates channel parameters of the communications channels identified as potentially significant interferers in accordance with the channel significance information, and transmits the estimated channel parameters to the transmitting device.

The present disclosure will be described with respect to example embodiments in a specific context, namely a Third Generation Partnership Project (3GPP) Long Term Evolution (LTE) compliant communications system that uses pilot sequences transmitted by transmission points to assist UEs estimate communications channel quality. The disclosure may also be applied, however, to other standards compliant and non-standards communications systems that uses pilot sequences to assist in communications channel quality estimation.

Figure 1:
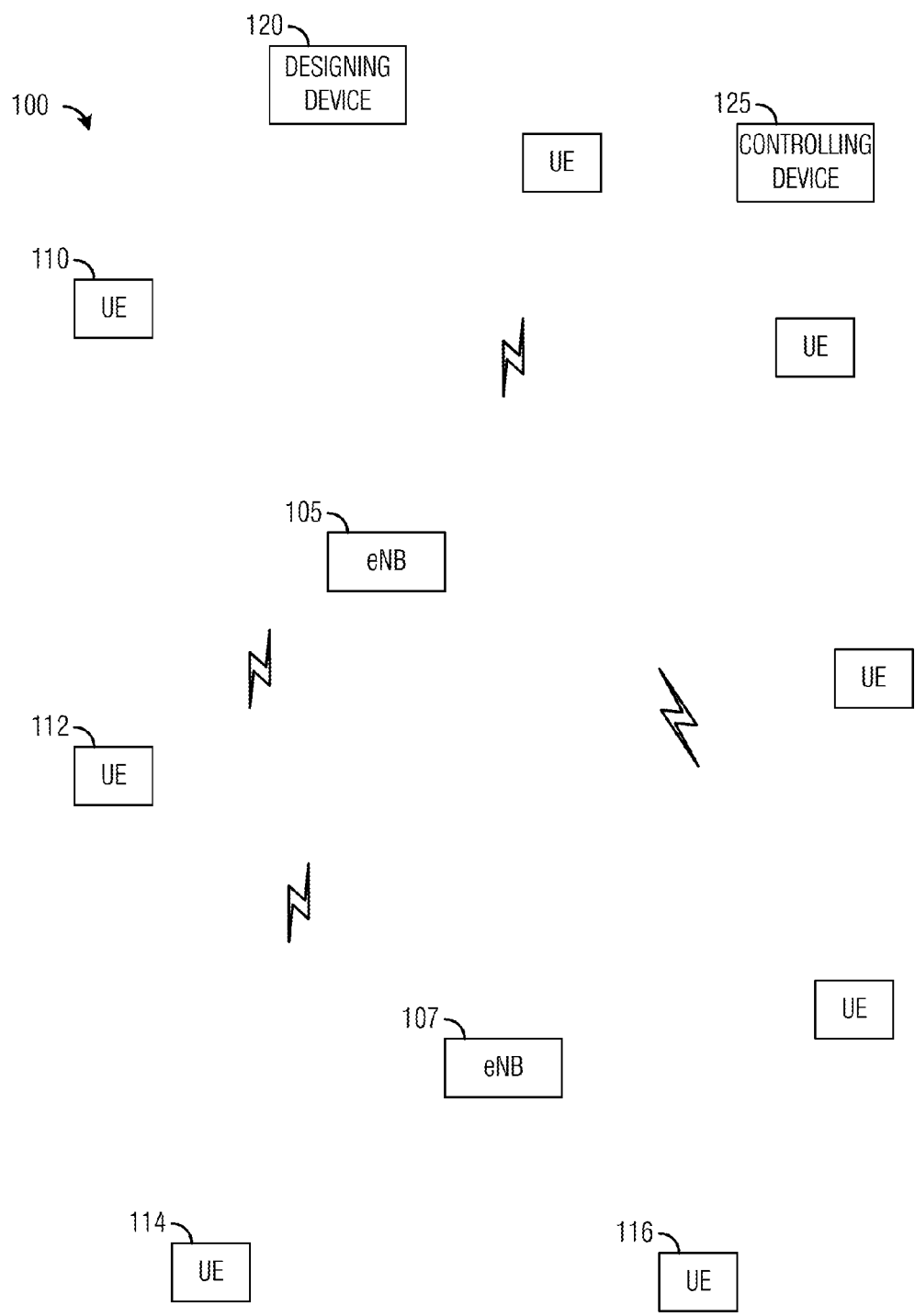
FIG. 1 illustrates an example communications system according to example embodiments described herein.

FIG. 1 illustrates an example communications system 100. Communications system 100 includes eNBs, such as eNB 105 and eNB 107. eNB 105 and eNB 107 may wirelessly serve a plurality of UEs, such as UE 110, UE 112, UE 114, and UE 116. Usually, communications to a UE or from a UE must flow through eNB 105. While it is understood that communications systems may employ multiple eNBs capable of communicating with a number of UEs, two eNBs and a number of UEs are illustrated in FIG. 1 for simplicity.

An eNB may use sectorized antennas to increase the number of UEs that the eNB can support. As an illustrative example, an eNB may use directional antennas with 120 degree sectors to divide its coverage area into three cell coverage areas. Each cell of the eNB may transmit independently of one another. Without loss of generality, the term cell may be used to refer to a portion of an eNB that through the use of a directional antenna communicates with a UE operating in a portion of the coverage area of the eNB, and cell coverage area may be used to refer to the corresponding portion of the coverage area of the cell. As an example, a cell may transmit a signal to a UE operating within its cell coverage area.

Figure 2A:
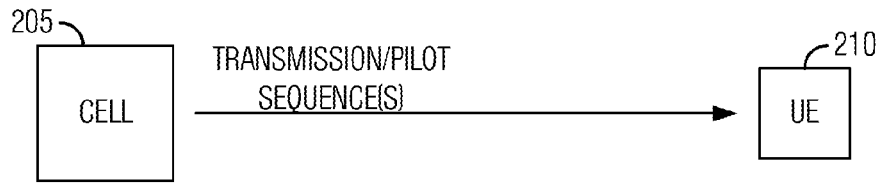
FIGS. 2a through 2c illustrate example pilot sequence transmission configurations according to example embodiments described herein.
Figure 2B:
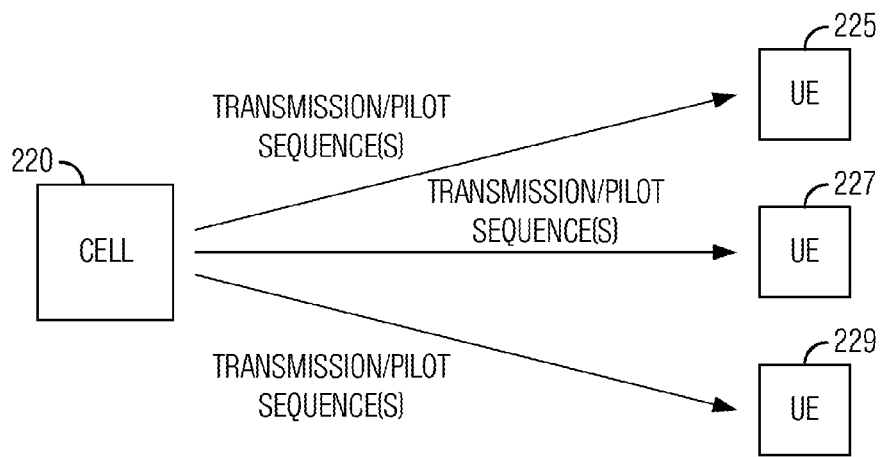
Figure 2C:
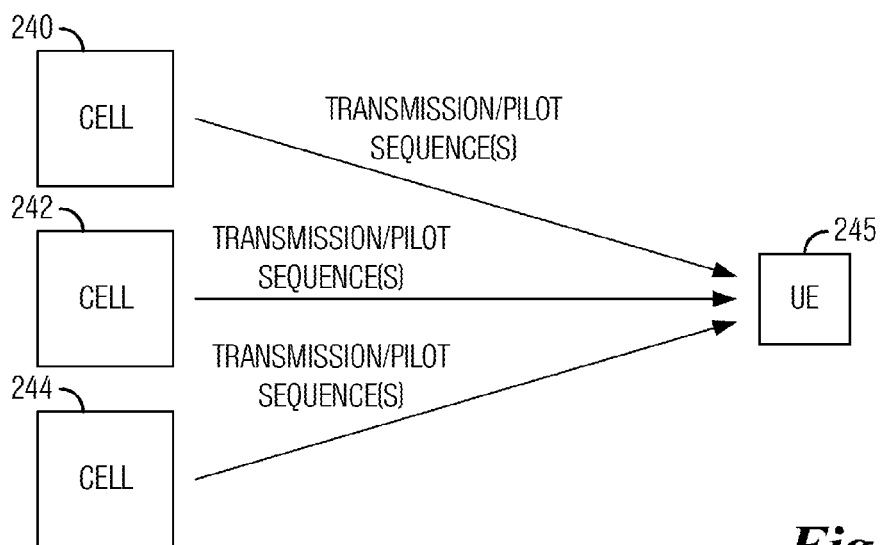

In a communications system, a transmission may occur in a number of different configurations. A first transmission configuration may be referred to as a one-to-one transmission where a cell may transmit to a single UE. FIG. 2a illustrates an example one-to-one transmission between a cell 205 and a UE 210. It is noted that the cell may be more generically referred to as a TP. A second transmission configuration may be referred as a one-to-many transmission where a cell may transmit to multiple UEs. FIG. 2b illustrates an example one-to-many transmission between a cell 220 and UEs 225, 227, and 229. A third transmission configuration may be referred to as a many-to-one transmission where multiple cells may transmit to a single UE. FIG. 2c illustrates an example many-to-one transmission between cells 240, 242, and 244 and UE 245. It is noted that other possible transmission configurations may be derived from combinations of these three transmission configurations.

As shown in FIGS. 2a through 2c, the cells may transmit a signal, such as pilot sequences (or equivalently pilots) to respective UEs that may be used to assist the UEs in estimating the communications channels between the cells and the UEs. Referring to FIG. 2a, cell 205 may transmit a pilot to UE 210 and UE 210 may use the pilot to estimate the communications channel between cell 205 and UE 210. Referring to FIG. 2b, cell 220 may transmit pilots to UEs 225, 227, and 229 and the UEs may use the pilots to estimate the three communications channels between cell 220 and the UEs. It is noted that the pilots transmitted by cell 220 may be the same or they may be different. Referring to FIG. 2c, cells 240, 242, and 244 may transmit unique pilots to UE 245 and UE 245 may use the unique pilots to estimate the three communications channels between cells 240, 242, and 244 and itself.

The transmissions shown in FIGS. 2a through 2c are downlink (DL) transmissions from cell to UE. Transmissions may also occur in the reverse direction, from UE to cell. Such transmissions are referred to as uplink (UL) transmissions. UL transmissions may originate at UE, remote radio heads, and the like. UL transmissions may also be used to estimate communications channels. Therefore the focus of the discussion on DL transmissions should not be construed as being limiting to either the scope or the spirit of the example embodiments.

Referring back now to FIG. 1, communications system 100 also includes a designing device 120. Designing device 120 may be used to design pilots for cells in communications system. Designing device 120 may design the pilots for the cells and store them for subsequent use, provide information about the pilots to the cells, or a combination thereof. It is noted that designing device 120 may be a stand-alone entity in communications system 100 as shown in FIG. 1. However, designing device 120 may be co-located with another entity in communications system 100. As an illustrative example, designing device 120 may be co-located with an eNB or some other network entity that is part of the infrastructure of communications system 100.

Communications system 100 also includes a controlling device 125. Controlling device 125 may be a stand-alone entity as shown in FIG. 1 or it may be co-located with another entity, such as an eNB. Controlling device 125 may perform a variety of controlling functions, such as allocating resources, cell assignment, power allocation, joint transmission method selection, and the like.

Figure 3:
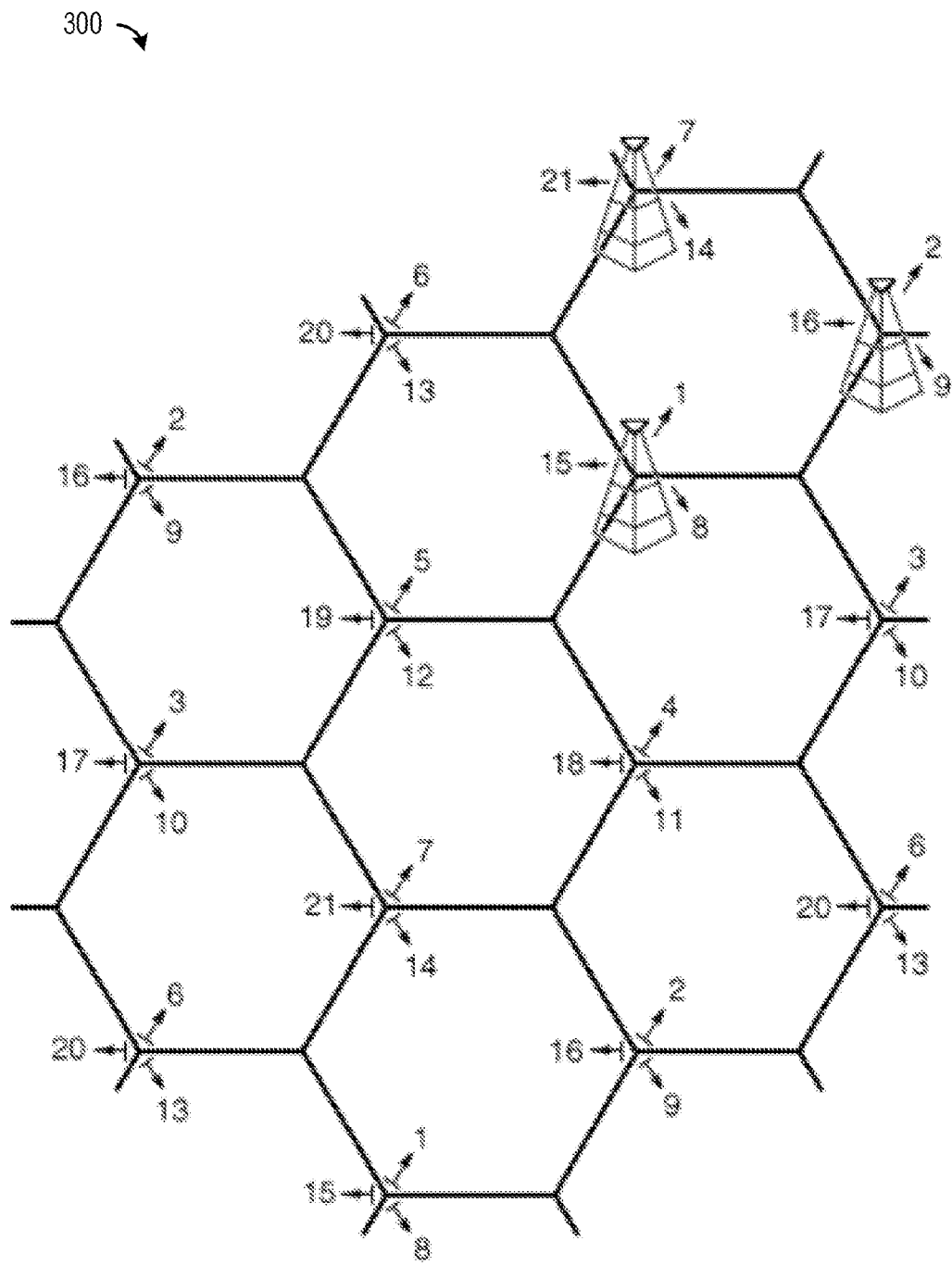
FIG. 3 illustrates an example communications system 300 with sectorized eNBs according to example embodiments described herein.

FIG. 3 illustrates an example communications system 300 with sectorized eNBs. As shown in FIG. 3, each eNB utilizes 120 degree directional antennas, thereby resulting in three cells (or TPs) per eNB. For illustrative purposes, consider a situation wherein there are 57 UE operating in communications system 300. With 57 UEs, 57 orthonormal pilots of length 57 are used to allow each UE to estimate the 57 communications channels (from each of the 57 cells) without interference. Two pilots are said to be orthonormal if they are orthogonal to each other and have unit vectors. It is then possible to express a received signal at a UE as $$r = P\Lambda + n,$$

where r represents the received 57×1 vector at the UE, vector $\Lambda$ represents the 57 communications channels to the UE, and n represents the noise vector.

In order to estimate the communications channels, it may be necessary to determine P*r as an estimate of $\Lambda$. It is noted that the estimation achieves the Cramer-Rao lower bound, so it may be optimal. However, pilots of length 57 may be too long for practical use. Furthermore, there are typically more than 57 cells, so interference may be a problem even if length 57 pilots are used.

To avoid confusion between pilots transmitted by cells, each cell may transmit a different pilot. The use of different pilots may enable the UEs to identify the source of the pilots. Sequences or transmissions of sequences from two or more cells occurring at the same time, the same frequency, and/or the same time and frequency may cause interference with one another unless the transmissions are orthogonal (or substantially orthogonal) to one another. Two sequences may be said to be orthogonal to each other if a correlation between the two sequences is equal to zero. Similarly, two sequences may be said to be substantially orthogonal to each other if the correlation between the two sequences is equal to zero plus/minus a threshold (where the threshold may be specified by a technical standard, an operator of the communications system, and the like). The threshold specifies a degree to which the two sequences may not be orthogonal to each other but still considered to be substantially orthogonal.

It is noted that in most cases, transmissions on communications channels from far away cells will cause less interference at a UE than transmissions on communications channels from close in cells. For example, a few communications channels from a few cells detectable by a UE may be strong enough to cause significant interference, and the communications channels from neighboring cells may be of significance. However, due to channel variations, it may be possible that some communications channels from non-neighboring channels are strong enough to cause significant interference. For discussion purposes, assume that 1<N of the channel coefficients is strong enough to be worth an estimation at the UE and the remainder of the channel coefficients are zeroes. If it is known in advance which of the cells is of importance, then, in the absence of noise, pilots of length 1 may be used to estimate these communications channels at UE j. In such a situation, the pilots may be chosen to be orthogonal or substantially orthogonal to each other (e.g., columns of a Fourier matrix of size 1×1).

However, the UEs generally do not know which of the underlying communications channels from the cells are significant interferers or potentially significant interferers. Nevertheless, there are some communications channels that are more likely to be significant interferers than other communications channels. In other words, the UE has a belief or probability value of a communications channel being significant interferer. The information may be used to design shorter pilots while providing good performance. The information may be provided to the UE in the form of channel significance information, which may be in the form of a numerical value associated with communications channels between cells in the communications system and the UE. The channel significance information may be specific to transmitter-receiver pairs. The numerical value associated with a communications channel may indicate the interference potential of the communication channel to the UE. As an illustrative example, a numerical value may range from 0 to 1 with a numerical value being equal to or close to 0 may indicate that the communications channel is a potentially significant interferer to the UE, while a numerical value being equal to or close to 1 may indicate that the communications channel is not a potentially significant interferer to the UE.

It may be possible to categorize communications channels (and associated cells) in accordance with the significance of their interference to a UE. As an illustrative example, there may be a continuous range of significance, as an example, a range from 0 to 1 with communications channels with values closer to 0 being potentially more significant interferers and communications channels with values closer to 1 being potentially less significant interferers. As an illustrative example, there may be three levels of significance: very significant, possibly significant, and not significant (or insignificant). It is noted that a different number of levels may be used. Therefore, the discussion of three levels of significance should not be construed as being limiting to either the scope or the spirit of the example embodiments.

A communications channel from a cell to a UE may be categorized as a very significant interferer to the UE in accordance with geographical criteria, such as, if it is a neighboring cell to a cell serving the UE. It is noted that a first cell may be a neighboring cell to a second cell if the first cell is a geographical neighbor of the second cell, meaning that the first cell is adjacent to the second cell. It is also noted that the first cell may be a neighboring cell to the second cell if the first cell meets one or more signal and/or interference criteria. Examples of the signal and/or interference criteria may include a signal strength of transmissions made by the first cell as received by the UE in the second cell meets a first threshold, a signal to noise ratio of transmissions made by the first cell as received by the UE in the second cell meets a second threshold, a signal to interference plus noise ratio of transmissions made by the first cell as received by the UE in the second cell meets a third threshold, and the like. Geographical, signal and/or interference criteria, or a combination thereof may be used to categorize a cell (and therefore a communications channel) the amount of interference caused to a UE.

A cell may be categorized as an insignificant interferer to the UE in accordance with geographical criteria, such as, if it is a distant cell to a cell serving the UE. It is noted that a first cell may be a distant cell to a second cell if the first cell is located far away from a second cell, meaning that there is a large amount of separation between the first cell and the second cell. It is also noted that the first cell may be a distant cell to the second cell if the first cell meets one or more signal and/or interference criteria. Examples of the signal and/or interference criteria may include a signal strength of transmissions made by the first cell as received by the UE in the second cell meets a fourth threshold, a signal to noise ratio of transmissions made by the first cell as received by the UE in the second cell meets a fifth threshold, a signal to interference plus noise ratio of transmissions made by the first cell as received by the UE in the second cell meets a sixth threshold, and the like. Geographical, signal and/or interference criteria, or a combination thereof may be used to categorize a cell as an insignificant interferer.

A cell may be categorized as a possibly significant interferer to the UE in accordance with geographical criteria, such as, if the cell is neither a significant interferer nor an insignificant interferer. Transmissions from a possibly significant interferer may or may not cause significant interference depending on variations in channel conditions. For example, a first cell that is a possibly significant interferer to a second cell may be located relatively close to the second cell but not so close that it would be categorized as a significant interferer. It is noted that it is also possible to categorize a cell according to signal and/or interference criteria. Examples of the signal and/or interference criteria may include a signal strength of transmissions made by a first cell as received by the UE in a second cell meets a seventh threshold, a signal to noise ratio of transmissions made by the first cell as received by the UE in the second cell meets an eighth threshold, a signal to interference plus noise ratio of transmissions made by the first cell as received by the UE in the second cell meets a ninth threshold, and the like. Geographical, signal and/or interference criteria, or a combination thereof may be used to categorize a cell as a possibly significant interferer.

Figure 4A:
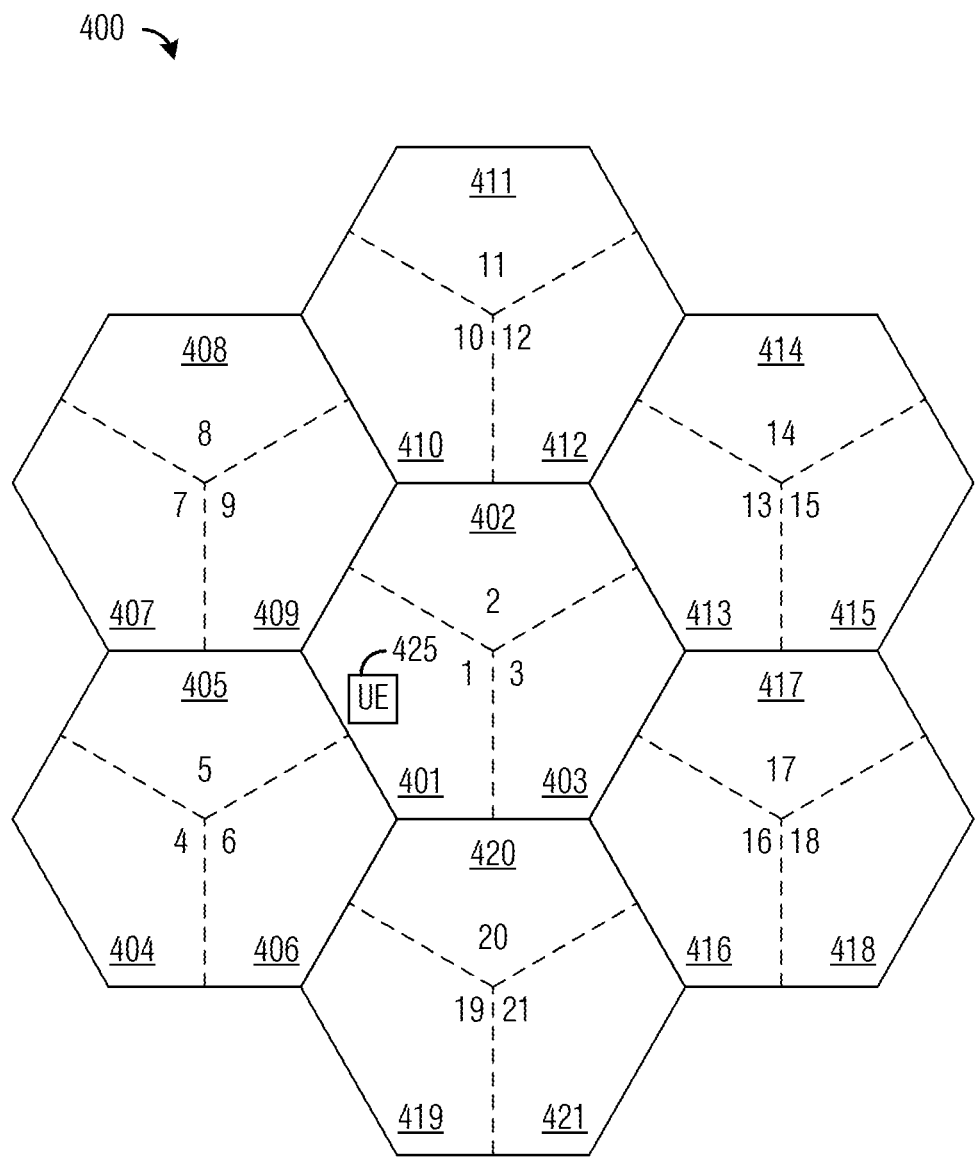
FIGS. 4a and 4b illustrate example cell groups of a communications system wherein eNB are using directional antennas with 120 degree sectors according to example embodiments described herein.

FIG. 4a illustrates a portion of an example communications system 400 wherein eNBs are using directional antennas with 120 degree sectors. Seven eNBs of communications system 400 are shown in FIG. 4a. With the coverage area of each eNB being partitioned into 3 cells, there are a total of 21 cells, numbered from 1 to 21 (the cells are shown with reference numerals 401 to 421). Also shown in FIG. 4a is UE 425 that is operating in cell 401. It is noted that although the discussion focuses on communications systems with the coverage areas of each eNB partitioned into 3 cells, the example embodiments presented herein are operable with communications systems with coverage areas being partitioned into any number of cells. The example embodiments are also operable in communications systems with coverage areas partitioned into different numbers of cells. Furthermore, the example embodiments are operable with heterogeneous communications systems with eNBs having different capabilities, such as different transmission power, resource availability, and the like, i.e., heterogeneous networks (HetNets).

Figure 4B:
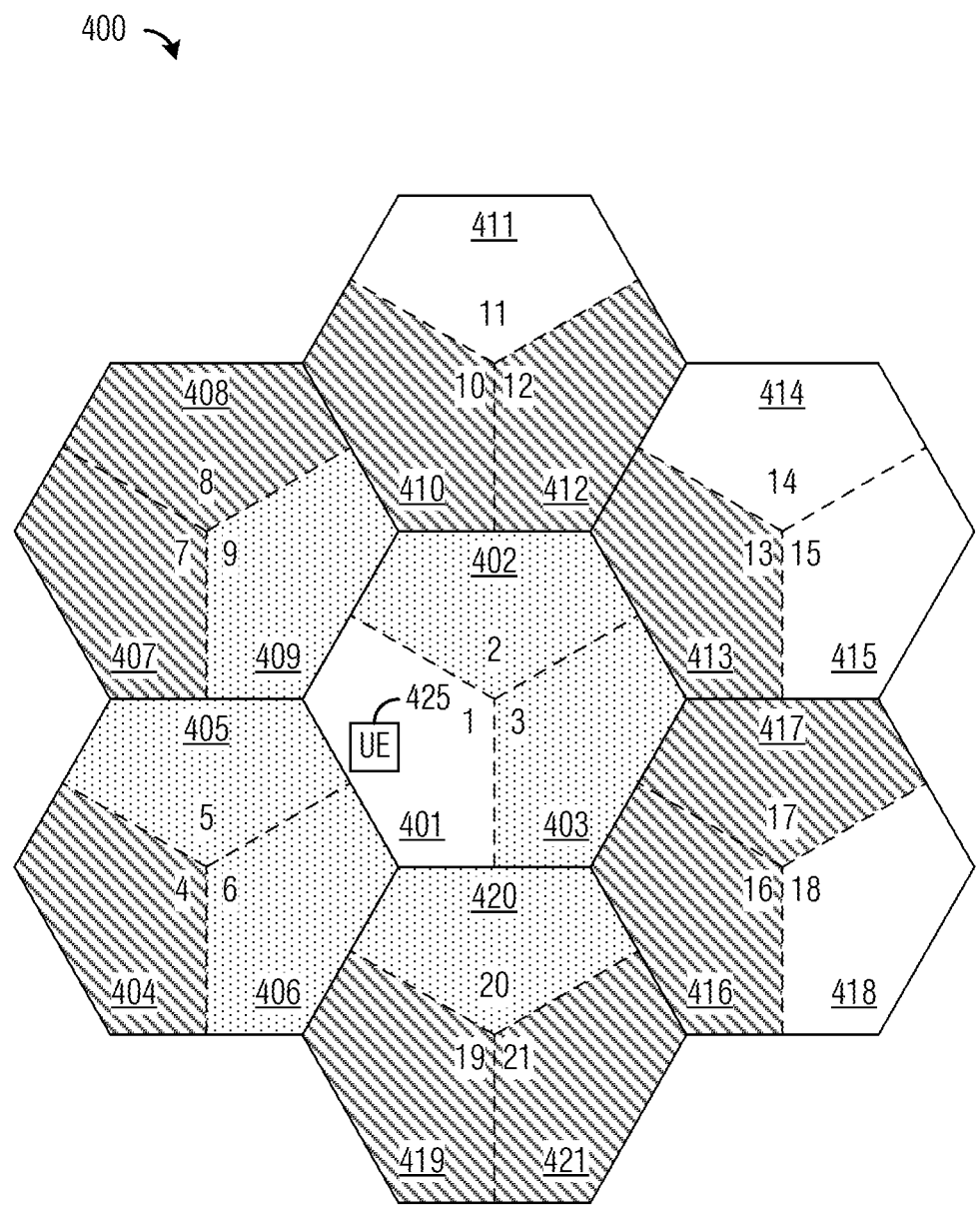

FIG. 4b illustrates an example categorization of cells in communications system 400 relative to cell 401. For discussion purposes, the categorization of cells relative to cell 401 (and hence their respective communications channels to UE operating in cell 401) will be made in accordance with geographical information. It is noted that the categorization of cells may be in accordance with geographical, signal and/or interference, or a combination thereof. As an example, a cell that is adjacent to cell 401 may be categorized as a significant interferer to cell 401. Therefore, communications between the cell to UE operating in cell 401 may be potentially significant interferers to the UE operating in cell 401. Hence, cells 402, 403, 405, 406, 409, and 420 are categorized as significant interferers to cell 401 (these cells are shown highlighted with a dotted hashing pattern). Similarly, communications channels between cells 402, 403, 405, 406, 409, and 420 and the UE operating in cell 401 may be potentially significant interferers to the UE operating in cell 401. These communications channels may be assigned a numerical value reflective of their potential as significant interferers, e.g., close to or equal to 0. As another example, a cell that is adjacent to a significant interferer of cell 401 may be categorized as a possibly significant interferer to cell 401. Therefore, cells 404, 407, 408, 410, 412, 413, 416, 417, 419, and 421 are categorized as possibly significant interferers to cell 401 (these cells are shown highlighted with a diagonal line hashing pattern). Similarly, communications channels between cells 404, 407, 408, 410, 412, 413, 416, 417, 419, and 421 and the UE operating in cell 401 may be potentially significant interferers to the UE operating in cell 401. These communications channels may be assigned a numerical value reflective of their potential as significant interferers, e.g., close to 0 (perhaps about equal to 0.1, 0.2, 0.3, and the like). As yet another example, remaining cells may be categorized as insignificant interferers to cell 401. As shown in FIG. 4b, cells 411, 414, 415, and 418 are categorized as insignificant interferers to cell 401. Similarly, communications channels between cells 411, 414, 415, and 418 and the UE operating in cell 401 may be insignificant interferers to the UE operating in cell 401. These communications channels may be assigned a numerical value reflective of their potential as significant interferers, e.g., close to 1. It is noted that FIG. 4b illustrates an example of categorization of cells and communications channels and that other example categorizations of cells and communications channels are possible. Furthermore, the use of different categorization criteria may result in different categorizations. It is also noted that FIG. 4b shows a portion of communications system 400. There may be additional cells that are not shown in FIG. 4b and therefore, are not discussed herein.

It is noted that although the discussion focuses on cells being sources of communications channels, other types of transmitters and transmitting devices may also be sources of communications channels. Examples of other types of transmitters may be macro cells, pico cells, femto cells, remote radio heads (RRH), and the like. Therefore, the discussion of cells being sources of communications channels should not be construed as being limiting to either the scope or spirit of the example embodiments.

An example embodiment provides an efficient method to estimate a channel using a low overhead pilot scheme when some interfering sources are unknown and some are known. For example, if n1 orthogonal pilots are received from known sources and n2 interfering signals are received from unknown sources, the communications channel can be well estimated, if the pilots are at least n1+2n2 long. This may be performed using an iterative method, using an initial value first and then computing, updating, and altering the received signal and the parameters of the communications channel in a sequence of steps using specific mathematical expressions. An example embodiment technique allows for shorter length pilots, which reduces the overhead considerably in large systems. Various example embodiments provide less overhead, less complexity and a scalable solution, even for large systems.

This channel estimation allows the design of an efficient pilot scheme where pilots can have shorter lengths and generally can perform better than those of existing systems/ classical methods. An example embodiment is based on the receiver knowing to a good extent some of the dominant interferers and knowing which subset of sectors may contain occasional significant interferers. An example embodiment channel estimation algorithm may be used with the pilot scheme or can be applied to existing systems with existing pilots.

An example embodiment is robust and has less overhead while at the same time being scalable. Channel estimation generally is an important component of many wireless communications standards, such as 3GPP LTE. Example embodiments may be implemented in wireless communications systems and devices, such as eNBs and UEs, and may be particularly applicable for dense networks such as heterogeneous networks (HetNet).

Figure 5:
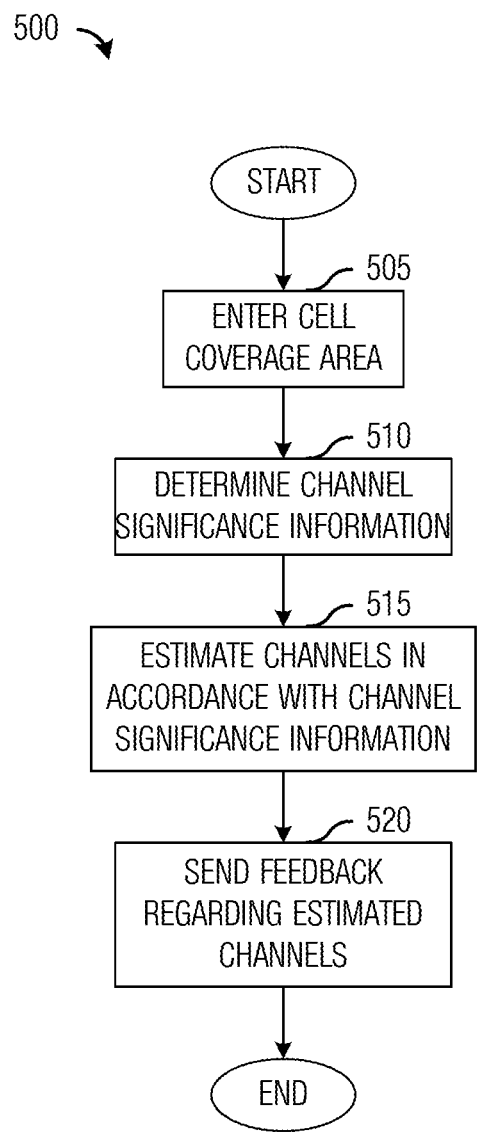
FIG. 5 illustrates a flow diagram of example operations 500 occurring in a UE as the UE performs channel estimation of channels from cells in a communications system and reports feedback regarding the estimated channels according to example embodiments described herein.

FIG. 5 illustrates a flow diagram of example operations 500 occurring in a UE as the UE performs channel estimation of channels from cells in a communications system and reports feedback regarding the estimated channels. Operations 500 may be indicative of operations occurring in a UE, such as UE 405, as the UE performs channel estimation of channels from cells in a communications system and reports feedback regarding the estimated channels.

Operations 500 may begin with the UE entering a cell coverage area (block 505). The UE may enter the cell coverage area of a cell of a wireless communications system as a result of the UE being powered on within the cell coverage area or participating in a handover to the cell. The UE may determine channel significance information (block 510). As an illustrative example, the UE may receive the channel significance information from the cell. The cell may provide the channel significance information to the UE after the UE enters the cell coverage area. Alternatively, the cell may periodically update the channel significance information and provide the updated the channel significance information to the UE. The channel significance information may be determined a priori by the cell and stored in a memory or a database. As another illustrative example, the UE may have the channel significance information stored in its memory and using geo-location information (e.g., information about its position, information about position of interferers, and the like) the UE may retrieve channel significance information in accordance with the geo-location information. Geo-location information may be derived from measurements made by entities in the wireless communications system, location services (such as global positioning system (GPS)), and the like. As another illustrative example, the channel significance information may be stored in a database (local or remote) that may be accessed by the UE to retrieve the channel significance information. The UE may use its geo-location information to help it retrieve the channel significance information. As yet another illustrative example, the UE may receive transmissions, such as beacons, reference signals, and the like, from cells in the wireless communications system, and the UE may derive the channel significance information from the received transmissions. The UE may determine the significance of a communications channel from a cell as a potential interferer by measuring, for example, a received signal power level, a transmission from the cell.

The channel significance information may include numerical values for communications channels of all cells in the wireless communications system. Alternatively, the channel significance information may include numerical values for communications channels of cells that are detectable by UE operating in the cell coverage area. In other words, the channel significance information may include numerical values for communications channels that are detectable by UE operating in the cell coverage area. As an illustrative example, let the numerical value $\delta_i$ be associated with a communications channel from cell i and may range from 0 to 1 with a numerical value being equal to or close to 0 may indicate that the communications channel from cell i being a potentially significant interferer to the UE, while a numerical value being equal to or close to 1 may indicate that the communications channel from cell i is not a significant interferer to the UE.

The UE may estimate channel parameters for the communications channels that are detectable in accordance with the channel significance information (block 515). In other words, the UE may estimate channel parameters for communications channels with numerical values that are equal to or substantially equal to 0. A threshold may be specified to set a specific cutoff for communications channels that are detectable. As an illustrative example, the UE may estimate channel parameters for communications channel with numerical values less than or equal to THRESHOLD, where THRESHOLD may be a specified value, such as in a range of 0.01 to 0.3, 0.4, 0.5, and the like. THRESHOLD may be set by a technical standard, and/or an operator of the communications system. THRESHOLD may also be dynamically adjusted to meet a performance metric. As an example, if the error rate in the communications system is too high, the THRESHOLD may be increased to estimate channel parameters for more communications channels. While if the error rate in the communications system is low, the THRESHOLD may be decreased to reduce computational complexity involved in estimating channel parameters by considering fewer communications channels.

For channel estimation, let the cells be labeled as cell 1, 2, . . . , N and let the UE be located in cell 1. Let the communications channels between cell 1, 2, . . . , N and the UE be denoted as $a_1, a_2, \ldots, a_N$. For discussion purposes, let communications channels be static during the pilot transmission period. Assume that these communications channels have to be estimated with at most 1 of them significant. Suppose the pilots $p_i$ that are designed with length m with cell i using pilots expressible as $$p_i = \begin{pmatrix} p_{1,i} \\ p_{2,i} \\ \vdots \\ p_{m,i} \end{pmatrix}.$$

If R is the received signal, n is the noise vector, $\Lambda$ is the channel matrix, and P is the matrix of pilots of the cells, then the received signal may be expressed as $$R = P\Lambda + n,$$

where $$R = \begin{pmatrix} r_1 \\ r_2 \\ \vdots \\ r_m \end{pmatrix}, \Lambda = \begin{pmatrix} \alpha_1 \\ \alpha_2 \\ \vdots \\ \alpha_m \end{pmatrix}, \text{ and } n = \begin{pmatrix} n_1 \\ n_2 \\ \vdots \\ n_m \end{pmatrix}.$$

The UE may feedback the estimated channel parameters to the cell (block 520). The UE may quantize the estimated channel parameters to help reduce communications overhead involved with feeding back the estimated channel parameters.

Figure 6:
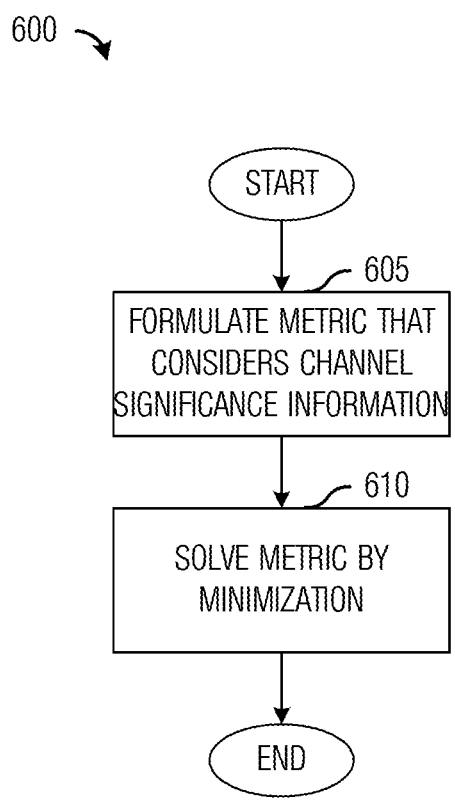
FIG. 6 illustrates a flow diagram of example operations 600 occurring in a UE as the UE estimates channels in accordance with channel significance information according to example embodiments described herein.

As discussed previously, in addition to estimating communications channels using downlink transmissions, uplink channels may also be used to estimate communications channels. As an example, a cell may use transmissions made by UEs, along with channel significance information, to estimate communications channels from UEs that are potentially significant interferers to the cell. Therefore, the focus on downlink transmissions being used for channel estima- FIG. 6 illustrates a flow diagram of example operations 600 occurring in a UE as the UE estimates channels in accordance with channel significance information. Operations 600 may be indicative of operations occurring in a UE, such as UE 405, as the UE estimates channels in accordance with channel significance information. Operations 600 may be an example implementation of block 515 of FIG. 5.

Operations 600 may begin with the UE formulating a metric that considers the channel significance information (block 605). An embodiment formulation of the metric is as follows. Let $1-\delta_i$ be a belief or probability that the communications channel from cell i is known to be significant (where $\delta_i$ is provided by the channel significance information). As an illustrative example, if $\delta_i=1$, then the communications channel is not known to be significant. The metric may be expressed as $$C(\Lambda) = \frac{1}{\sigma^2}\|R - P\Lambda\|_2^2 + \lambda \sum_{i=1}^{N} \delta_i |\alpha_i|,$$

where $\|x\|_2$ is the Euclidean Distance (or Euclidean Norm) of x, $|x|$ is the Magnitude of x, $\sigma$ is a noise power, and $\lambda$ is a weighting factor. The term $\lambda \sum_{i=1}^{N} \delta_i |\alpha_i|$ of the metric $C(\Lambda)$ may be determined in part from the channel significance information and allows for the significance of the communications channels as potential interferers to be considered. It is noted that if $\delta_i=0$ for all i, then all communications channels from all cells are important and the metric $C(\Lambda)$ turns into a classical Euclidean metric. Furthermore, if there is no channel significance information (i.e., $\delta_i$ is not known), the metric $C(\Lambda)$ turns into $L_1$ regularized compressed sensing metrics.

The UE may solve for $\Lambda$ by minimizing the metric $C(\Lambda)$ (block 610).

It is noted that minimizing the metric $C(\Lambda)$ may be computationally complex. According to an example embodiment, a technique referred to as Expectation Maximization (EM) may be used to solve the metric $C(\Lambda)$.

Figure 7A:
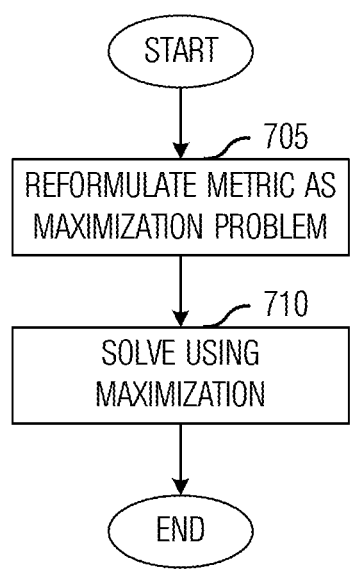
FIG. 7a illustrates a flow diagram of example operations 700 occurring in a UE as the UE solves the metric C(Λ) by reformulating the metric C(Λ) according to example embodiments described herein.

FIG. 7a illustrates a flow diagram of example operations 700 occurring in a UE as the UE solves the metric $C(\Lambda)$ by reformulating the metric $C(\Lambda)$. Operations 700 may be indicative of operations occurring in a UE, such as UE 405, as the UE solves the metric $C(\Lambda)$ by reformulating the metric $C(\Lambda)$.

Operations 700 may begin with the UE reformulating the metric $C(\Lambda)$ (block 705). As discussed previously, minimizing the metric $C(\Lambda)$ may be computationally intensive. However, it may be possible to reformulate the metric $C(\Lambda)$ so that solving for $\Lambda$ may not be as computationally intensive. It is noted that mathematically, minimizing the metric $C(\Lambda)$ is equal to maximizing a negative of the metric $C(\Lambda)$. Additionally, taking the log of an exponential is a mathematical identity. Therefore, the metric $C(\Lambda)$ may be reformulated to produce a reformulated metric that is expressible as $$\log\left(\exp\left(\frac{-\|R - P\Lambda\|_2^2}{\sigma^2}\right) \exp\left(-\sum_{i=1}^{N} \lambda \delta_i |\alpha_i|\right)\right).$$

The reformulated metric may be referred to as a parametric log likelihood maximization problem. It is noted that the underlying parameters of the reformulated metric are functions of channel parameters. The minimizing of the metric $C(\Lambda)$, i.e., solving the metric, is mathematical equal to maximizing the log likelihood of the reformulated metric (block 710). The channel parameters may be estimated in accordance with the parametric log likelihood maximization problem.

According to an example embodiment, the EM technique may be used to solve the reformulated metric. The EM technique may be a good method to iteratively solve maximizing problems. In other words, depending on how the problem is structured, the EM technique may allow for the solving of maximizing problems without requiring a large amount of computational resources.

Figure 7B:
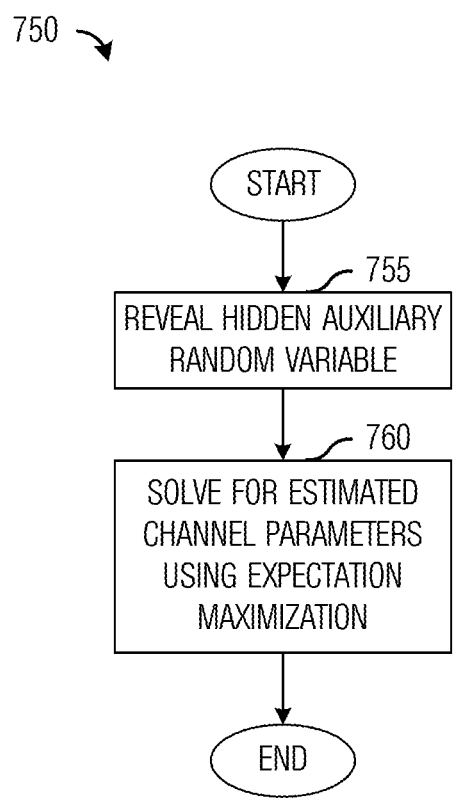
FIG. 7b illustrates a flow diagram of example operations 750 occurring in a UE as the UE solves the reformulated metric using the EM technique according to example embodiments described herein.

FIG. 7b illustrates a flow diagram of example operations 750 occurring in a UE as the UE solves the reformulated metric using the EM technique. Operations 750 may be indicative of operations occurring in a UE, such as UE 405, as the UE solves the reformulated metric using the EM technique.

Operations 750 may begin with the UE revealing a hidden auxiliary random variable (block 755). For discussion purposes, consider the reformulated metric expressible as $$\log\left(\exp\left(\frac{-\|R - P\Lambda\|_2^2}{\sigma^2}\right) \exp\left(-\sum_{i=1}^{N} \lambda \delta_i |\alpha_i|\right)\right)$$

as discussed above. Let $s_1$ be a maximal eigenvalue of $PP^*$, where $P^*$ is a Hermititan of P, and $n_1$ and $n_2$ be independent and identically distributed (iid) Gaussian vectors that are distributed according to a Normal distribution N (0, I) and N $(0,\sigma^2 I-\beta^2 P P^*)$, where I is an identity matrix, $\beta$ is a numerical value greater than 0 and is chosen so that $\beta^2/\sigma^2 < 1/s_1$. It is noted that once P is selected, the values $s_1$ may be determined and $\beta^2/\sigma^2$ may be set to $\frac{1}{2}s_1$, for example. Therefore, no actual knowledge of $\sigma$ (the noise power) is needed. The hidden auxiliary random variable may be expressed as $$v = \Lambda + \beta n_1,$$

where v is the auxiliary random variable. It is noted the above expression for v is one example expression and that other expressions of v are possible. Statistically speaking, $$R = Pv + n_2,$$

which may be solved using the EM technique (block 760).

Figure 8:
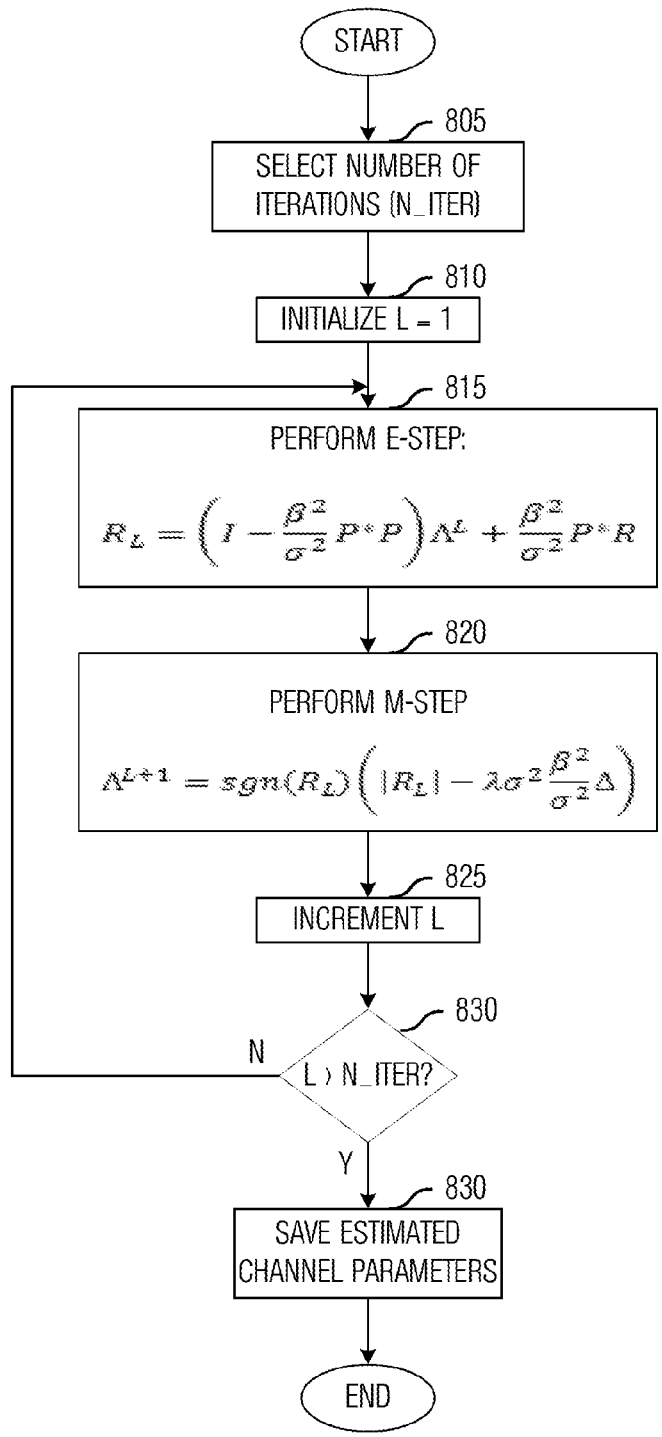
FIG. 8 illustrates a flow diagram of example operations 800 occurring in a UE as the UE uses the EM technique to solve for the estimated channel parameters according to example embodiments described herein.

FIG. 8 illustrates a flow diagram of example operations 800 occurring in a UE as the UE uses the EM technique to solve for the estimated channel parameters. Operations 800 may be indicative of operations occurring in a UE, such as UE 405, as the UE uses the EM technique to solve for the estimated channel parameters.

Utilizing the expression $R=Pv+n_2$ derived previously, the UE may solve for the estimated channel parameters using the EM technique. The UE may begin by selecting a number of iterations of the EM technique (block 805). In general, a larger number of iterations may yield more accurate estimated channel parameters at the expense of requiring more computational resources. The UE may initialize a local variable L (block 810). As an example, L may be set to 1.

The UE may start with initial values for the estimated channel parameters, i.e., $\Lambda^1$. As an example, if the UE has previously estimated the communications channels, the UE may use the previously estimated channel parameters as the initial values for the estimated channel parameters $\Lambda^1$. As an alternative example, the UE may use default values for the channel parameters as the initial values for the estimated channel parameters $\Lambda^1$.

The UE may form an E-step of the EM technique to determine the L-th iteration of the received signal R, $R_L$ (block 815). The UE may determine $R_L$ using an expression expressible as $$R_L = \left(I - \frac{\beta^2}{\sigma^2} P^* P\right)\Lambda^L + \frac{\beta^2}{\sigma^2} P^* R.$$

The UE may perform an M-step of the EM technique to determine the (L+1)-th iteration of the estimated channel parameters $\Lambda^{L+1}$ (block 820). The UE may determine the $\Lambda^{L+1}$ using an expression expressible as $$\Lambda^{L+1} = \text{sgn}(R_L)\left(|R_L| - \lambda\sigma^2\frac{\beta^2}{\sigma^2}\Delta\right),$$

where $\Delta$ is a vector where an i-th element if $\Delta$ is $\delta_i$, and $$\text{sgn}(x) = \frac{x}{|x|}$$

for $x \neq 0$ and ½ for $x=0$.

The UE may increment the local variable L (block 825) and perform a check to determine if it has performed the requisite number of iterations, i.e., L>number of iterations (block 830). If the UE has not performed the requisite number of iterations, the UE may return to block 815 to repeat the E-step and the M-step. If the UE has performed the requisite number of iterations, the UE may save the estimated channel parameters $\Lambda^{L+1}$ for subsequent use (block 830).

According to an example embodiment, the values of $\beta^2/\sigma^2$ and $\lambda\sigma^2$ may be fine-tuned. Furthermore, depending on the initial values, faster and/or slower convergence to an optimum value of $\Lambda$ may be achieved. Additionally, depending on the initial value of the estimated channel parameters $\Lambda^1$, faster and/or slower convergence to the optimum value of $\Lambda$ may be achieved. In general, the example embodiments presented herein have low complexity and fast convergence, particularly with short pilots. The example embodiments may also be used with existing wireless communications systems with existing pilots.

Figure 9:
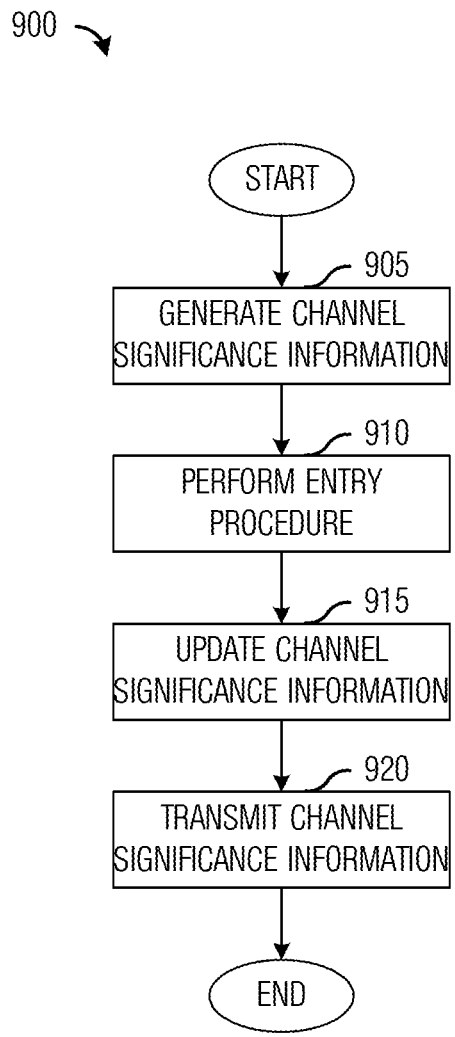
FIG. 9 illustrates a flow diagram of example operations 900 occurring in a cell as the cell provides channel significance information according to example embodiments described herein.

FIG. 9 illustrates a flow diagram of example operations 900 occurring in a cell as the cell provides channel significance information. Operations 900 may be indicative of operations occurring in a cell, such as cell 401, as the cell provides channel significance information.

Operations 900 may begin with the cell generating channel significance information (block 905). As discussed previously, channel significance information may be based on the amount of interference that other cells in the communications system may cause to UE operating in the cell coverage area of the cell. The amount of interference may be based on a number of criteria, including geographical, signal, and/or interference. The cell may measure transmissions made by the other cells or it may rely on interference reports provided by its UE to generate the channel significance information. As an example, the channel significance information may include a numerical value of each of the other cells, with a numerical value being close to 0 indicating that a communications channel for an associated cell to the UE may be a potentially significant interferer. Similarly, a numerical value being close to 1 may indicate that such a communications channel not being a potentially significant interferer.

The cell may perform an entry procedure with a UE (block 910). The cell may perform an update on the channel significance information (block 915). The cell may transmit the channel significance information to the UE(s) operating in its cell coverage area (block 920). The cell may broadcast the channel significance information or multicast the channel significance information. The cell may transmit the channel significance information to individual UE.

According to an example embodiment, the channel significance information may be dynamically updated when the topology of the wireless communications system is changed or modified. In such a situation, the cell can obtain the channel significance information based on user feedback (e.g., reference signal received power (RSRP) report) to form a neighboring list (or interference map, similar to what is done in intercell interference coordination (ICIC) self-configuration or centralized radio access network (CRAN) self-clustering), and then decide on appropriate channel significance information.

Figure 10:
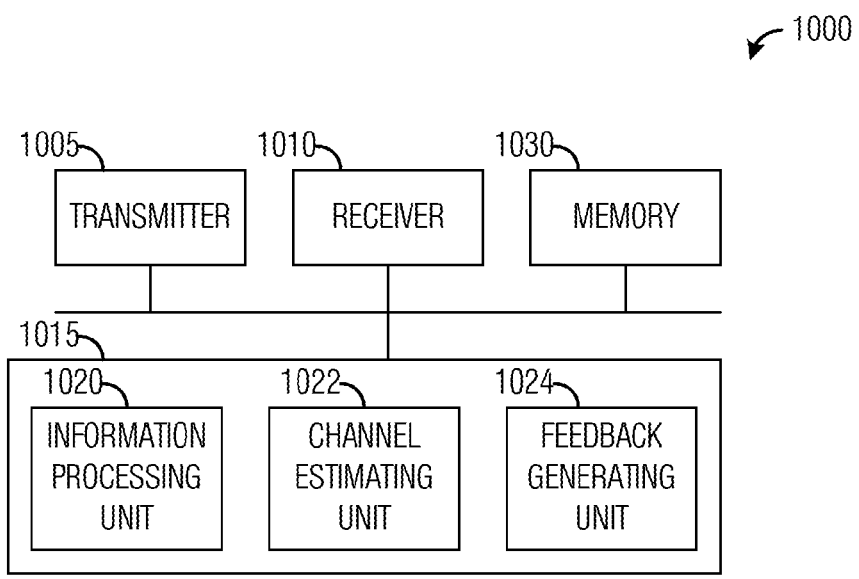
FIG. 10 illustrates a first example communications device according to example embodiments described herein.

FIG. 10 illustrates a first example communications device 1000. Communications device 1000 may be an implementation of a station, a user equipment, a terminal, a subscriber, a mobile station, and the like. Communications device 1000 may be used to implement various ones of the embodiments discussed herein. As shown in FIG. 10, a transmitter 1005 is configured to transmit packets, feedback about estimated channel parameters, and the like. Communications device 1000 also includes a receiver 1010 that is configured to receive packets, channel significance information, pilots, and the like.

An information processing unit 1020 is configured to process channel significance information received from a cell. Information processing unit 1020 is configured to select communications channels that are potentially significant interferers to communications device 1000. A channel estimating unit 1022 is configured to estimate channel parameters of communications channels in accordance with the channel significance information. In other words, channel estimation unit 1022 is configured to estimate channel parameters for communications channels that are potentially significant interferers to communications device 1000. Channel estimation unit 1022 is configured to use the EM technique to estimate the channel parameters. A feedback generating unit 1024 is configured to generate feedback to be provided to the cell. Feedback generating unit 1024 is configured to quantize the estimated channel parameters to reduce communications overhead. A memory 1030 is configured to store channel significance information, channel measurements, estimated channel parameters, quantized channel parameters, feedback information, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while information processing unit 1020, channel estimating unit 1022, and feedback generating unit 1024 may be software modules executing in a microprocessor (such as processor 1015) or a custom circuit or a custom compiled logic array of a field programmable logic array. Information processing unit 1020, channel estimating unit 1022, and feedback generating unit 1024 may be modules stored in memory 1030.

Figure 11:
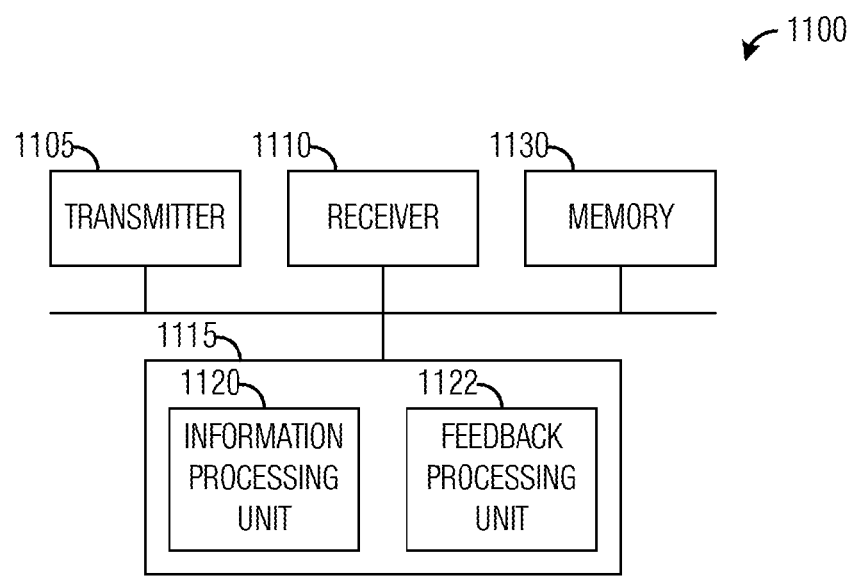
FIG. 11 illustrates a second example communications device according to example embodiments described herein.

FIG. 11 illustrates a second example communications device 1100. Communications device 1100 may be an implementation of a cell, a macro cell, a pico cell, a femto cell, a RRH, and the like. Communications device 1100 may be used to implement various ones of the embodiments discussed herein. As shown in FIG. 11, a transmitter 1105 is configured to transmit packets, pilots, channel significance information, and the like. Communications device 1100 also includes a receiver 1110 that is configured to receive packets, feedback, and the like.

An information processing unit 1120 is configured to generate channel significance information. Information processing unit 1120 is configured to generate channel significance information from interference measurements made by communications device 1100 and/or reports of interference measurements made by UE. A feedback processing unit 1022 is configured to process feedback information about channel parameters estimated by UEs operating in the cell coverage area of communications device 1100 to help adjust transmitter 1105. A memory 1130 is configured to store channel significance information, channel measurements, estimated channel parameters, quantized channel parameters, feedback information, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while information processing unit 1120, and feedback processing unit 1122 may be software modules executing in a microprocessor (such as processor 1115) or a custom circuit or a custom compiled logic array of a field programmable logic array. Information processing unit 1020, and feedback processing unit 1122 may be modules stored in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for estimating communications channels, the method comprising:
   receiving, by a first receiving device operating within range of interfering transmitting devices, channel significance information for communications channels, of the interfering transmitting devices, that are potentially significant interferers to the first receiving device, wherein the channel significance information includes a probability, for each of the communications channels of the interfering transmitting devices, that the each communications channel is a significant interferer to the first receiving device;
   estimating, by the first receiving device, channel parameters of the communications channels of the interfering transmitting devices in accordance with the channel significance information including the probabilities; and
   transmitting, by the first receiving device, the estimated channel parameters to a controller associated with communication for the first receiving device.

2. The method of claim 1, wherein the first receiving device receives the channel significance information from the controller.

3. The method of claim 2, wherein the channel significance information is determined in accordance with geo-location information.

4. The method of claim 2, wherein the channel significance information is stored in a memory of the controller, and wherein the channel significance information is determined by retrieving the channel significance information from the memory in accordance with geo-location information associated with the first receiving device.

5. The method of claim 4, further comprising:
   before the receiving the channel significance information, receiving transmissions from the interfering transmitting devices; and
   transmitting interference measurements of the transmissions from the interfering transmitting devices to the controller for determination of the channel significance information from the interference measurements, and storage of the channel significance information in the memory.

6. The method of claim 1, wherein the channel significance information comprises a numerical value for each of the probabilities.

7. The method of claim 6, wherein the numerical value ranges from 0 to 1, and wherein a value closer to 0 than 1 indicates that an associated communications channel of a respective interfering transmitting device is a potentially significant interferer.

8. The method of claim 1, wherein estimating the channel parameters comprises:
   formulating a metric that considers the channel significance information; and
   solving the metric by minimization.

9. The method of claim 8, wherein solving the metric comprises:
   reformulating the metric as a parametric log likelihood maximization problem where underlying parameters are functions of channel parameters;
   revealing a hidden auxiliary random variable of the parametric log likelihood maximization problem; and
   estimating the channel parameters in accordance with the parametric log likelihood maximization problem and the revealed auxiliary random variable using an expectation maximization technique.

10. The method of claim 9, wherein solving for the estimated channel parameters comprises:
    determining channel parameters $\Lambda^1$, where $\Lambda$ is a channel matrix;
    setting a counter variable L=1;
    determining a L-th received signal $R_L$ from channel parameters $\Lambda^L$, where R is a received signal;
    determining channel parameters $\Lambda^{L+1}$ in accordance with the received signal $R_L$;
    incrementing L; and
    repeating determining the L-th received signal $R_L$, determining the channel parameters $\Lambda^{L+1}$, and incrementing L, until L exceeds a specified value.

11. The method of claim 10, wherein the channel parameters $\Lambda^1$ are set to specified initial values.

12. The method of claim 10, wherein the specified value is a number of iterations of the expectation maximization technique.

13. The method of claim 10, wherein determining the L-th received signal $R_L$ is expressible as $$R_L = \left(I - \frac{\beta^2}{\sigma^2}P^*P\right)\Lambda^L + \frac{\beta^2}{\sigma^2}P^*R,$$

and wherein determining the channel parameters $\Lambda^{L+1}$ is expressible as $$\Lambda^{L+1} = \text{sgn}(R_L)\left(|R_L| - \lambda\sigma^2\frac{\beta^2}{\sigma^2}\Delta\right),$$

where |x| is a Magnitude of x, $\sigma$ is a noise power, $\lambda$ is a weighting factor, P is a matrix of pilots of transmitting devices in a communications system, P* is a Hermititan of P, $s_1$ be a maximal eigenvalue of P P*, $\beta$ is a numerical value greater than 0 and is chosen so that $\beta^2/\sigma^2 < 1/s_1$, $\Delta$ is a vector where an i-th element if $\Delta$ is $\delta_i$, and $$\text{sgn}(x) = \frac{x}{|x|}$$

for $x \neq 0$ and ½ for x=0.

14. The method of claim 1, wherein the first receiving device is a User Equipment (UE) and the controller is an enhanced Node B.

15. The method of claim 1, wherein the first receiving device is a User Equipment (UE) and the controller is a centralized radio access network (CRAN) controller.

16. The method of claim 1, further comprising using, by the first receiving device, the channel parameters for transmissions by the first receiving device.

17. The method of claim 4, wherein the channel significance information is determined by the controller after obtaining information from the interfering transmitting devices.

18. The method of claim 17, wherein the information obtained from the interfering transmitting devices includes measurements of signals received by the interfering transmitting devices from user equipments at different locations, and wherein the channel significance information is determined from the measurements of the signals and stored in the memory.

19. The method of claim 1, wherein the first receiving device is an enhanced node B and the controller is a centralized radio access network (CRAN) controller.

20. A user equipment (UE) operating within range of interfering transmitting devices, the UE comprising:
a receiver configured to receive channel significance information for communications channels, of the interfering transmitting devices, that are potentially significant interferers to the UE, wherein the channel significance information includes a probability, for each of the communications channels of the interfering transmitting devices, that the each communications channel is a significant interferer to the UE, and
a processor operatively coupled to the receiver, the processor configured to estimate channel parameters of the communications channels of the interfering transmitting devices in accordance with the channel significance information including the probabilities; and
a transmitter operatively coupled to the processor, the transmitter configured to transmit the estimated channel parameters to a controller associated with communication for the first receiving device.

21. The UE of claim 20, wherein the receiver is configured to receive the channel significance information from the controller.

22. The UE of claim 20, wherein the channel significance information is stored in a memory of the controller, and wherein the channel significance information is retrieved from the memory in accordance with geo-location information associated with the UE.

23. The UE of claim 20, wherein the channel significance information comprises a numerical value for each of the probabilities.

24. The UE of claim 20, wherein the processor is configured to formulate a metric that considers the channel significance information, and to solve the metric by minimization.

25. The UE of claim 24, wherein the processor is configured to reformulate the metric as a parametric log likelihood maximization problem where underlying parameters are functions of channel parameters, to reveal a hidden auxiliary random variable of the parametric log likelihood maximization problem, and to estimate the channel parameters in accordance with the parametric log likelihood maximization problem and the revealed auxiliary random variable using an expectation maximization technique.

26. The UE of claim 25, wherein the processor is configured to determine channel parameters $\Lambda^1$, where $\Lambda$ is a channel matrix, to set a counter variable L=1, to determine a L-th received signal $R_L$ from channel parameters $\Lambda^L$, where R is a received signal, to determine channel parameters $\Lambda^{L+1}$ in accordance with the received signal $R_L$, to increment L, and to repeat the determine the L-th received signal $R_L$, the determine the channel parameters $\Lambda^{L+1}$, and the increment L, until L exceeds a specified value.

27. The UE of claim 26, wherein the processor determines the L-th received signal $R_L$ by evaluating $$R_L = \left(I - \frac{\beta^2}{\sigma^2}P^*P\right)\Lambda^L + \frac{\beta^2}{\sigma^2}P^*R,$$

and determines the channel parameters $\Lambda^{L+1}$ by evaluating $$\Lambda^{L+1} = \text{sgn}(R_L)\left(|R_L| - \lambda\sigma^2\frac{\beta^2}{\sigma^2}\Delta\right),$$

where |x| is Magnitude of x, $\sigma$ is a noise power, $\lambda$ is a weighting factor, P is a matrix of pilots of transmitting devices of a communications system, P* is a Hermititan of P, $s_1$ be a maximal eigenvalue of P P*, $\beta$ is a numerical value greater than 0 and is chosen so that $\beta^2/\sigma^2 < 1/s_1$, $\Delta$ is a vector where an i-th element if $\Delta$ is $\delta_i$, and $$\operatorname{sgn}(x) = \frac{x}{|x|}$$

for x≠0 and ½ for x=0.

28. The UE of claim 20, wherein the channel significance information is determined in accordance with geo-location information.

29. The UE of claim 22, further comprising:
the receiver configured to receive transmissions from the interfering transmitting devices, before receiving the channel significance information;
the processor configured to determine interference measurements of the transmissions from the interfering transmitting devices; and
the transmitter configured to transmit the interference measurements to the controller for determination of the channel significance information from the interference measurements, and storage of the channel significance information in the memory.

30. The UE of claim 23, wherein the numerical value ranges from 0 to 1, and wherein a value closer to 0 than 1 indicates that an associated communications channel of a respective interfering transmitting device is a potentially significant interferer.

31. The UE of claim 26, wherein the channel parameters $\Lambda^1$ are set to specified initial values, and wherein the specified value is a number of iterations of the expectation maximization technique.

32. The UE of claim 20, further comprising the processor configured to use the channel parameters for transmissions by the UE.

33. The UE of claim 22, wherein the channel significance information is determined by the controller after obtaining information from the interfering transmitting devices.

34. The UE of claim 33, wherein the information obtained from the interfering transmitting devices includes measurements of signals received by the interfering transmitting devices from user equipments at different locations, and wherein the channel significance information is determined from the measurements of the signals and stored in the memory.

35. The UE of claim 20, wherein the controller is an enhanced Node B or a centralized radio access network (CRAN) controller.

* * * * *

UNITED STATES PATENT AND TRADEMARK OFFICE
CERTIFICATE OF CORRECTION

PATENT NO. : 9,544,789 B2  
APPLICATION NO. : 14/104908  
DATED : January 10, 2017  
INVENTOR(S) : Vahid Tarokh Page 1 of 1

It is certified that error appears in the above-identified patent and that said Letters Patent is hereby corrected as shown below:

On the Title Page

Item (71) Applicant, Line 2, delete "Shenzhen OT (CN)" and insert --Shenzhen (CN)--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*